US007455277B2

(12) United States Patent
Bishop et al.

(10) Patent No.: US 7,455,277 B2
(45) Date of Patent: Nov. 25, 2008

(54) ANTITHEFT APPARATUS FOR A CONDUIT STRUCTURE

(76) Inventors: Byron N. Bishop, 32931 Bryant St., Wildomar, CA (US) 92595; Richard J. Bender, 32923 Bryant St., Wildomar, CA (US) 92595

( * ) Notice: Subject to any disclaimer, the term of this patent is extended or adjusted under 35 U.S.C. 154(b) by 275 days.

(21) Appl. No.: 11/511,612

(22) Filed: Aug. 28, 2006

(65) Prior Publication Data

US 2008/0078218 A1 Apr. 3, 2008

(51) Int. Cl.
*F16M 13/00* (2006.01)

(52) U.S. Cl. ........................... 248/552; 248/71; 248/73; 248/87; 248/156; 70/181

(58) Field of Classification Search ................. 248/551, 248/552, 49, 71, 73, 87, 88, 156; 256/DIG. 5, 256/65.14; 52/632, 169.13, 296, 295, 170, 52/293.3; 404/6, 9, 11; 49/35, 49; 70/181, 70/227
See application file for complete search history.

(56) References Cited

U.S. PATENT DOCUMENTS

| | | | | |
|---|---|---|---|---|
| 259,263 | A | 5/1925 | Daroowalla | |
| 3,660,935 | A * | 5/1972 | Boots | 49/35 |
| 3,802,232 | A | 4/1974 | Mattson et al. | |
| 3,809,348 | A * | 5/1974 | Di Laura | 248/49 |
| 3,857,575 | A | 12/1974 | Lee | |
| 3,879,907 | A * | 4/1975 | Olson | 52/297 |
| 3,944,079 | A | 3/1976 | Boslough | |
| 3,972,639 | A * | 8/1976 | Lening | 403/191 |
| 4,373,303 | A | 2/1983 | Stratichuk | |
| 6,082,697 | A * | 7/2000 | Grunfeld | 248/508 |
| 6,484,544 | B1 * | 11/2002 | Wing | 70/227 |
| 2004/0011096 | A1 | 1/2004 | Quinn et al. | |
| 2004/0177661 | A1 | 9/2004 | Klinsic | |

* cited by examiner

*Primary Examiner*—Korie H. Chan
(74) *Attorney, Agent, or Firm*—Gene Scott, Patent Law + Venture Group

(57) ABSTRACT

A pipe run is secured from theft by an antitheft apparatus providing a pair of straight tubes, coaxially engaged with an inner one of the tubes slidingly engaged within an outer one of the tubes. Each of the tubes provides a closure plate at one end with one or more apertures in it. A cover on an upper end of the inner tube is able to engage the pipe run to prevent it from being disassembled or pulled from its installation. To service the pipe run, the cover may be opened and the inner pipe lowered into the outer pipe. The tubes are secured to a mooring. Two of the apparatuses may be secured in spaced apart locations on the pipe run to secure components of the pipe run that are between the apparatuses.

6 Claims, 2 Drawing Sheets

ANTITHEFT APPARATUS FOR A CONDUIT STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to security devices for preventing theft of articles accessible to the general public and especially out of doors, and more particularly to the securing of pipe runs especially for drinking water.

2. Description of Related Art Including Information Disclosed Under 37 CFR 1.97 and 1.98

Quinn et al., U.S. 2004/00111096, discloses a method of securing an ATV or any device that allows for connection with the invention. The invention, known as Sureloc, has a five axis articulating head design which allows for connection with a device in any direction. The Auger section of Sureloc allows for securing a device into the ground without assistance from other objects. This allows Sureloc to be used as a portable security device. The shaft of Sureloc has a vertical movement of approximately 6" as an adjustment to reach various heights of different devices. The shad guide rotates 180 degrees giving Sureloc a 2' attachment range in a 360 degree area.

Kinsic, U.S. 2004/0177661, discloses an antitheft locking assembly for a motorbike that is anchored to the ground or other immobile anchorage, and locks over the motorbike in a manner that prevents theft of the motorbike. The antitheft locking assembly has first post means adapted to be anchored to the ground and second post means spaced apart from the first post means. The second post means comprises a mounting post member adapted to be mounted securably into the ground and a locking post member adapted to be lockably engaged to the mounting post member and extend upwardly therefrom. Rail means adjustably interconnect the first post means and the locking post member and is movable between a first position where the rail means) allows access of the motorbike to and from a parked location in a space between the first post means and the second post means, and a second position where the rail means obstructs access of the motorbike to and from the parked location. The rail means is lockably secured in its second position over the motorbike So as to prevent the theft of the motorbike.

Daroowalla, U.S. Pat. No. 259,263, discloses a device for securing water taps against theft from their positions on supply pipes consisting o a bracket or clamp secured round the tap and locked or secured to an adjacent wall.

Mattson et al., U.S. Pat. No. 3,802,232, discloses a bicycle that includes a down tube extending diagonally from a steering head above the yoke which supports the front wheel to a bottom bracket which supports the pedal crank shaft. A bicycle locking rack includes a locking box fixedly mounted in position where the bicycle can be parked with a central portion of the down tube immediately adjacent the locking box. A pair of parallel down tube retaining bars are integral with and extend outwardly from the box in position to encompass the bicycle down tube when the bicycle is so parked. A key operated locking mechanism within the box permits a J-shaped bike locking bar to be slide ably mounted with respect to the box for movement between a closed condition where the shorter end of the J-bar extends through openings provided in each of the retaining bars to be in an encompassing, locked relationship to a bicycle down tube situated between the retaining bars, and an opening of only on of the retaining bars and is in clearing relation to the opening between the retaining bars and the down tube situated there between.

Lee, U.S. Pat. No. 3,857,575, discloses a telescoping trailer hitching post having a ball coupling member at its upper end for coupling engagement with a coupling socket at the front end of a trailer tongue, a pair of rings welded to opposite sides of the post, a chain anchored at its one end to one of the rings and adapted to be wrapped around the trailer tongue and locked by means of a padlock to the one or to the opposite ring to prevent theft of the trailer. A ground receptacle is anchored in concrete with its upper end flush with the surface of the ground, and the post is telescoped within the receptacle between a completely housed position within the receptacle and a raised position above the ground. A pair of vertically spaced discs are provided near the bottom end of the post, for cooperative engagement with a vertical key welded to the inside of the receptacle adjacent its top edge to support the post in the raised position and to prevent the post from being pulled out of the receptacle.

Boslough, U.S. Pat. No. 3,944,079, discloses a bicycle stand which holds a bicycle upright in place, and to which the bicycle may be locked. An upright member, embedded in cement, or anchored to a base plate, has an arm pinned hingeably, with parallel plates welded on each side of the arm that project past the free end of the arm. A U-shaped bracket is hinged to one plate, which may be passed about a frame member of a bicycle and fitted into a slot in the plate, with holes in the bracket for fastening the shackle of a lock, with the lock shackle completely enclosed by the two parallel plates in the latched position.

Stratichuk, U.S. Pat. No. 4,373,303, discloses a tubular portion that is embedded vertically into the ground and has a screw threaded upper end substantially flush with the surface of the ground. A screw threaded stem or post detachably engages the upper end when a trailer is to be parked thereon, and the stem is provided with the ball portion of a trailer coupler assembly on the upper end thereof engageable by the coupler portion of the trailer coupler assembly situated on the front end of the hitch frame. A padlock through the release lever prevents unauthorized removal of the trailer from the post and the post can be unscrewed and stored when the trailer is not parked at the post assembly.

The related art described above discloses several devices for securing articles so as to avoid theft. Of particular interest is Klinsic which tube-in-tube construction with dual spaced apart units. Also, Lee, who teaches a similar arrangement for setting a hitching post in an extended or a retracted position. Stratichuk is similar to Lee but does not use telescoping tubes. However, the prior art fails to disclose a means for mounting telescoping tubes above ground, yet secured to piers, and also fails to disclose a clasp suitable for gripping a section of pipe. The prior art does not disclose a pair of pipe gripping clasps spaced apart for protecting pipe structure between. Therefore, the present disclosure distinguishes over the prior art providing heretofore unknown advantages as described in the following summary.

BRIEF SUMMARY OF THE INVENTION

This disclosure teaches certain benefits in construction and use which give rise to the objectives described below.

Drinking water is supplied through pipes that must be tested from time to time for bacteria and other potential problems. To accomplish this these water pipes, which are typically laid under ground, are formed with pipe run portions that are positioned above ground level to provide access to certain test fixtures on these pipe runs. Because component parts of these pipe runs may become a temptation to thieves for their resale value, or to terrorists, securement of these systems may be necessary. To accomplish this at low cost, the present invention uses a pair of straight tubes, coaxially engaged with an inner one of the tubes slidingly engaged within an outer one of the tubes. Each of the tubes provides a closure plate at one end with one or more apertues in it. A cover on an upper end of the inner tube is able to engage the pipe run to prevent it from being disassembled or pulled from its installation. To service the pipe run, the cover may be opened and the inner pipe lowered into the outer pipe. The tubes are secured to a mooring. Two of the apparatuses may be positioned in spaced apart locations on the pipe run to secure components of the pipe run that are between the apparatuses.

A primary objective inherent in the above described apparatus and method of use is to provide advantages not taught by the prior art.

Another objective is to provide an apparatus for securing a water pipe testing station while allowing easy access to the pipe structure that makes-up the station.

A further objective is to provide such an apparatus that is able to grip a pipe run at two spaced apart locations to secure components therebetween.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 3:
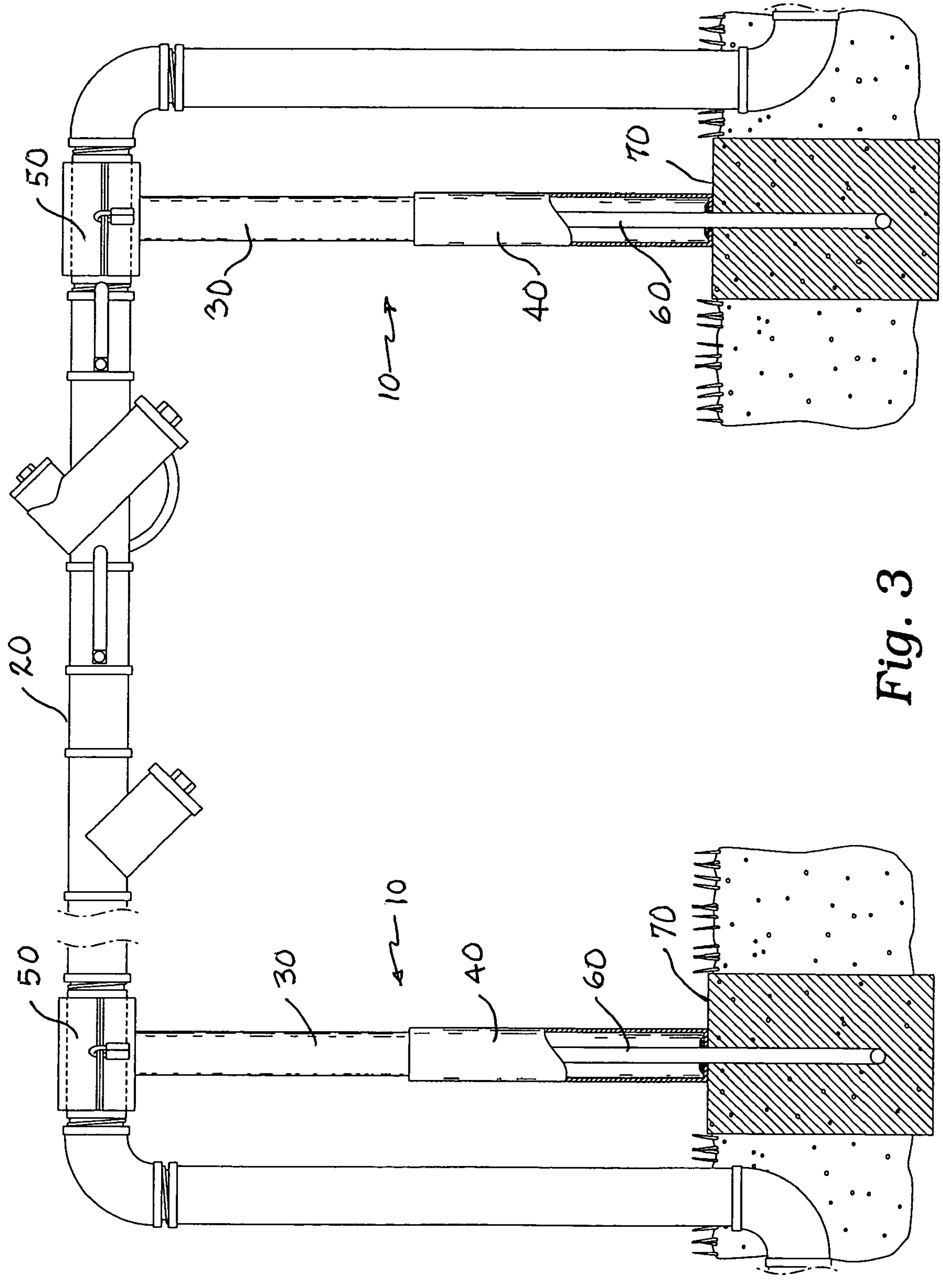
FIG. 3 is a front elevational view thereof as used in pairs with a water testing station.

Described now in detail is an antitheft apparatus 10 for a conduit structure such as conduits that carry water, oil, fuel, electrical wires, optical fibers and so forth. In this disclosure, such conduits shall be referred to as a "pipe run" and denoted on the attached drawings by numeral 20. In that the apparatus 10 and the pipe run 20 are bi-functional, i.e., each influences the physical state of the other, we shall consider apparatus 10 and pipe run 20 to be a combination article in one embodiment of this invention. The antitheft apparatus 20 may be used as a single unit, in pairs as shown in FIG. 3, or in numbers. The term "pipe run" as used herein is any single or plurality of conduits, pipes, guides, etc., generally, but not necessarily, set in a straight line. For instance, the set of horizontal water pipes shown in FIG. 3 is an example of the pipe run 20.

Figure 1:
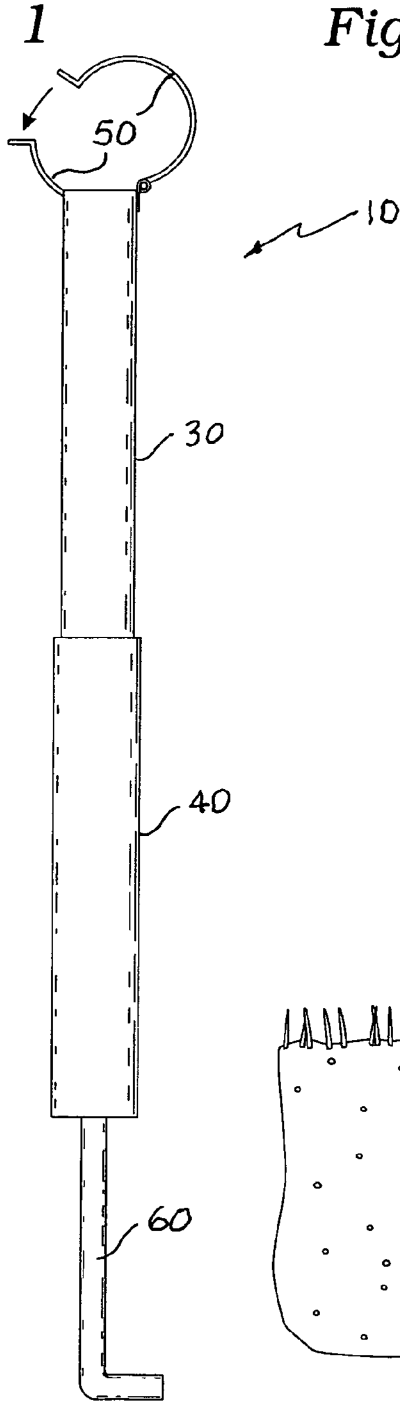
FIG. 1 is a side elevational view of the presently described apparatus.

In a first preferred embodiment of the disclosed invention, as shown in FIG. 1, the apparatus 10 includes a pair of straight tubes referred to by numerals 30 and 40, where an inner one of the tubes 30 is slidingly engaged within an outer one of the tubes 40. The tubes 30, 40 are made of a metal or other hard material that is not easily pierced, broken or deformed. Each of the tubes 30 and 40 provides, distally (in the direction toward the bottom of each of the figures), an end plate 32 and 42 (see FIG. 2), wherein these plates 32 and 42 each have bored in them at least one aperture, shown by numerals 34 and 44 respectively. The inner tube 30 provides, proximally, a clamp 50, which may be a hasp and staple or any similar structure, as shown in an open attitude in FIG. 1, and in a closed attitude in FIGS. 2 and 3.

Figure 2:
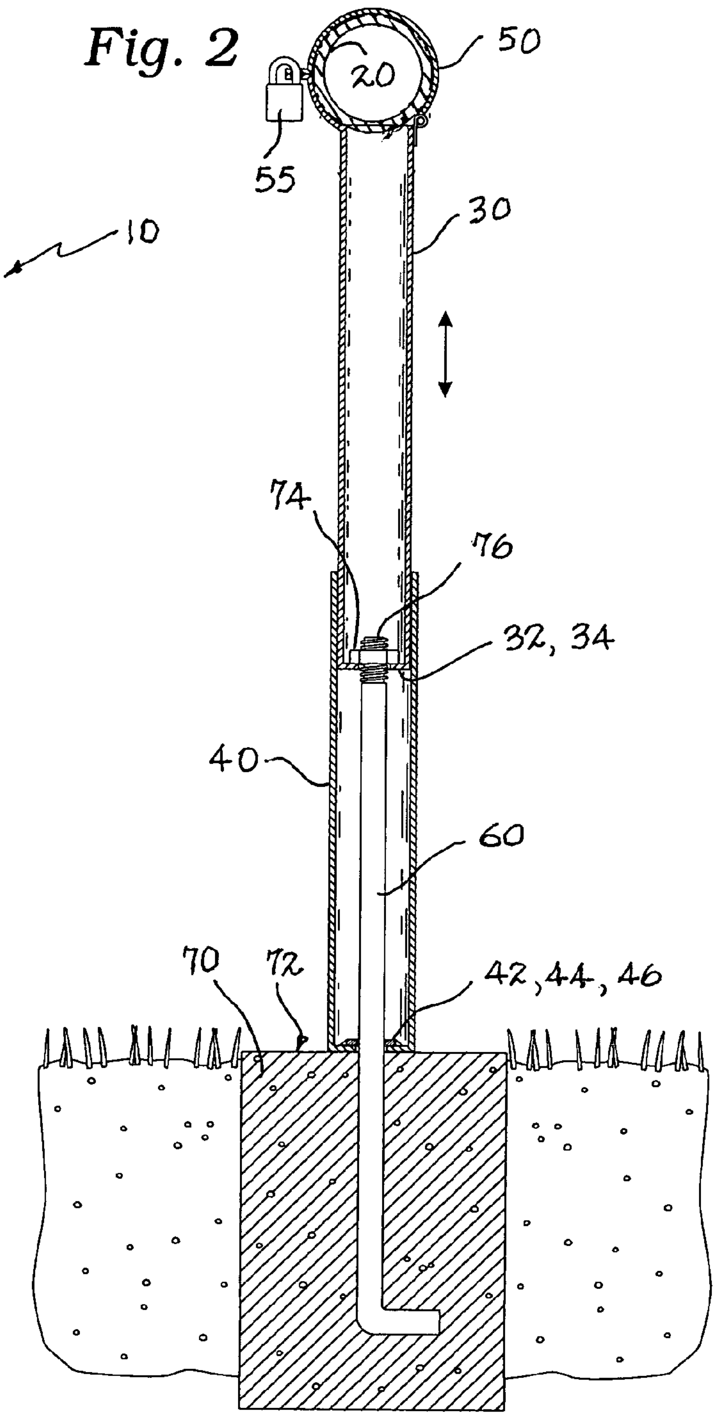
FIG. 2 is a vertical sectional view thereof as installed.

A J-shaped steel lag bar 60 engages one of the apertures 34, of plate 32 and extends through and distally beyond plate 42, as shown in FIG. 2. Tube 30 therefore, is free to slide along lag bar 60 within tube 40 when clamp 50 is open.

Typically, when the apparatus is installed for use, the lag bar 60 is set into a mooring 70 such as a concrete block or footing as shown in FIGS. 2 and 3. Also, plate 42 of tube 40 is fastened to the up-facing surface 72 of mooring 70 by common fasteners, i.e., bolts. Therefore, tube 40 is rigidly secured in an upright attitude and tube 30 is placed within tube 40 and lowered until plates 32 and 42 are adjacent. With that completed, a nut 74 or other fastener is engaged with the proximal terminal end of lag bar 70 which is adapted for receiving nut 74 or other fastener such as by providing an external thread 76. This is clearly shown in FIG. 2. Now tube 30 is able to be raised or lowered within tube 40 at will, but since plate 32 cannot pass over nut 74, tube 30 cannot be removed or disengaged from tube 40 or lag bar 60 without disengaging nut 74 from lag bar 60. The terminal end of lag bar 60, and the nut 74 are positioned so that the tubes 30 and 40 cannot be disengaged.

Critically, clamp 50 is shaped, as for instance circularly for a round pipe, so as to tightly circumscribe a portion of the pipe run 20. It is considered critical that clamp 50 lie in an abutting relationship with the portion of the pipe run 20 so that a jimmy or crow-bar cannot be used to pry clamp 50 loose. To this point, should pipe run 20 take a cross-sectional shape other than round, clamp 50 will mimic the shape so as to assure a tight abutting fit.

In a further embodiment of the present invention, as shown in FIG. 2, the apparatus 10, described above and secured in mooring 70, and the pipe run 20, form an operant combination wherein the horizontal pipe run 20 is positioned at a vertical distance above the pier 70 such that the range of telescoping motion of tube 30 is able to position clamp 50 for coupling with pipe run 20, and, in fact, the two elements of this embodiment apparatus 10 and pipe run 20 are locked together by clamp 50 which includes lock 55.

In a still further embodiment of the present invention, as shown in FIG. 3, a pair of the apparatuses 10, secured in moorings 70, are assembled with pipe run 20 and form a combination. In this configuration, the apparatuses 10 are spaced apart such that valuable components of pipe run 20 are positioned between the apparatuses 10. In this manner, it becomes difficult to remove the components when clamps 50 are in place, and yet with clamps 50 are opened, pipes 30 may be moved downwardly to enable full access to the components and to the entire pipe run 20.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An antitheft apparatus for a conduit structure comprising: a pair of straight tubes; one of the tubes slidingly engaged within the other of the tubes; each of the tubes providing, distally, a closure plate with at least one aperture therein; an inner one of the tubes providing, proximally, an integral clamp engagable with the conduit structure in an abutting relationship when the inner one of the tubes is extended from the outer one of the tubes; a lag bar engaged, proximally, within the at least one aperture of the inner one of the tubes, the lag bar extending through and distally beyond the at least one aperture of an outer one of the tubes, wherein, the inner one of the tubes is free to slide along the lag bar within the outer one of the tubes when the clamp is not engaged with the pipe run.

2. The apparatus of claim 1 further comprising a mooring, the lag bar, distally, fixed therein, the outer one of the tubes, distally, fastened to the mooring.

3. The apparatus of claim 1 wherein the clamp is shaped so as to tightly circumscribe a portion of the pipe run.

4. A combination comprising: a pipe run and an antitheft apparatus; the antitheft apparatus having: a pair of straight tubes; one of the tubes slidingly engaged within the other of the tubes; each of the tubes providing, distally, a closure plate with at least one aperture therein; an inner one of the tubes providing, proximally, an integral clamp removably engaged with the conduit structure in an abutting relationship when the inner one of the tubes is extended from the outer one of the tubes; a lag bar engaged, proximally, within the at least one aperture of the inner one of the tubes, the lag bar extending through and distally beyond the at least one aperture of an outer one of the tubes, wherein, the inner one of the tubes is free to slide along the lag bar within the outer one of the tubes when the clamp is not engaged with the pipe run.

5. The apparatus of claim 4 further comprising a mooring, the lag bar, distally, fixed therein, the outer one of the tubes, distally, fastened to the mooring.

6. A combination comprising: a pipe run and a pair of antitheft apparatuses; each one of the antitheft apparatuses having: a pair of straight tubes; one of the tubes slidingly engaged within the other of the tubes; each of the tubes providing, distally, a closure plate with at least one aperture therein; an inner one of the tubes providing, proximally, an integral clamp engagable with the conduit structure in an abutting relationship when the inner one of the tubes is extended from the outer one of the tubes; a lag bar engaged, proximally, within the at least one aperture of the inner one of the tubes, the lag bar extending through and distally beyond the at least one aperture of an outer one of the tubes, wherein, each of the inner ones of the tubes are free to slide along the respective lag bar within the respective outer one of the tubes when the respective clamp is not engaged with the pipe run; the pair of antitheft apparatuses placed in spaced apart positions on the pipe run with the respective lag bars engaged with moorings for securing the apparatus.

* * * * *